United States Patent [19]

Gassaway

[11] 4,395,672
[45] Jul. 26, 1983

[54] BATTERY CHARGER CONTROLLER

[76] Inventor: Lee V. Gassaway, 1660 SW. 196th Ave., Aloha, Oreg. 97005

[21] Appl. No.: 250,395

[22] Filed: Apr. 2, 1981

[51] Int. Cl.³ ............................................... H02J 7/06
[52] U.S. Cl. ....................................... 320/31; 320/21; 320/40
[58] Field of Search ....................... 320/21, 37, 38, 45, 320/55, 31, 40

[56] References Cited

U.S. PATENT DOCUMENTS 3,500,167  3/1970  Applegate et al. .................... 320/37
3,895,282  7/1975  Foster et al. ........................... 320/21

Primary Examiner—William H. Beha, Jr.
Attorney, Agent, or Firm—Oliver D. Olson

[57] ABSTRACT

The timer in a conventional timer-controlled battery charger is replaced with an electronic controller which is connected between the alternating current input and the direct current output of the charger and includes a set of electronic timer-controlled relay contacts that are connected in series with the conventional alternating current power contactor coil of the charger. When the charger is connected to a battery to be charged, the battery voltage activates the controller. If the battery voltage is within a predetermined voltage range relative to the charger, then the relay is activated, thereby energizing the alternating current power contactor coil and the charger. When the battery voltage reaches and stays above a preset level for a predetermined time interval, the controller turns off the charger. At a predetermined number of charging cycles said predetermined time interval is automatically lengthened to provide an equalize charge function. If the battery voltage never reaches the preset level, the controller turns off the charger after a predetermined elapsed time. If the battery voltage goes too high, due to a faulty charger, the controller turns off the charger immediately.

12 Claims, 4 Drawing Figures

BATTERY CHARGER CONTROLLER

BACKGROUND OF THE INVENTION

This invention relates to battery chargers, and more particularly to an electronic controller by which a battery charger may be turned on and off in accordance with voltage conditions at the battery being charged.

Some battery chargers have been provided heretofore that operate automatically to turn off if the output voltage exceeds a safe maximum. However, these prior battery chargers require manual starting.

Other battery chargers have been provided heretofore that provide an equalize charge function. However, they involve the manual resetting of a timer or the manual operation of an activating switch, such as pushbutton or toggle.

All known battery chargers provided heretofore can be connected to wrong size batteries, with consequent damage to the battery or charger.

All known battery chargers provided heretofore have been capable of delayed turn on by external timers. However, the timer may effect premature turn-off and may also effect recycling of the charger.

SUMMARY OF THE INVENTION

In its basic concept, the battery charger controller of this invention provides electronic sensing of voltage levels for battery recharging to effect the turning on and off of the charger at appropriate times.

Another object of this invention is the provision of a battery charger controller of the class described which may be integrated into a conventional timer-controlled charger by substituting the controller for the timer component.

Still another object of this invention is to provide a battery charger controller of the class described which will not allow the charger to operate when connected to a wrong size battery.

A further object of this invention is the provision of a battery charger controller of the class described which will effect operation of the charger automatically upon connection of a battery to the charger or upon connection of the battery charger to a source of alternating current power, if the voltage level is in the safe range.

A still further object of this invention is to provide a battery controller of the class described which operates to turn off the charger whenever voltage levels are outside a preset range.

Another object of this invention is the provision of a battery charger controller of the class described which will vary the battery charging time to match the battery re-charge needs.

Still another object of this invention is the provision of a battery charger controller of the class described which will automatically extend the charge dependent time interval at a preset number of charging cycles to provide an equalize charge function.

A further object of this invention is to provide a battery charger controller of the class described which will allow delayed starting of the charging function.

A further object of this invention is to provide a battery charger controller of the class described which is of simplified construction for economical manufacture and is operable with reproducible precision over a long service life with minimum maintenance and repair.

The foregoing and other objects and advantages of this invention will appear from the following detailed description, taken in connection with the accompanying drawings of preferred embodiments.

DESCRIPTION OF THE PREFERRED EMBODIMENTS

Figure 1:
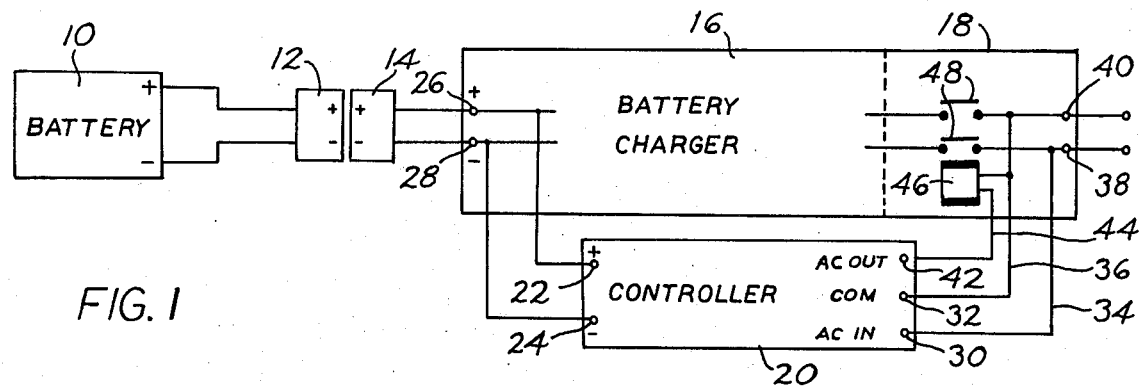
FIG. 1 is a block diagram showing the electrical association of a battery removably connectable to a battery charger connected permanently to a sound alternating current potential, and a charger controller embodying the features of this invention.

FIG. 1 shows the general arrangement of a battery charging system which is suitable for use in charging batteries which are capable of being removably connected to a battery charger that is permanently connected to a source of alternating current potential. Such a use is exemplified by the servicing of the batteries of a fleet of electrically powered lift trucks. The system includes the battery 10 to be charged, battery connectors 12, charger connectors 14, battery charger 16 with its alternating input contactor component 18, connected to a source of alternating current potential, and a battery charger controller 20 of this invention.

The direct current terminals 22 and 24 of the controller are connected through electrical conductors to the direct current output terminals 26 and 28 of the battery charger. The alternating current input terminal 30 and common terminal 32 of the controller are connected through electrical conductors 34 and 36 to the alternating current input terminals 38 and 40 of the contactor 18. The alternating current output terminal 42 is connected through electrical conductor 44 to one end of the coil 46 of the alternating current input contactor relay which is provided with contacts 48. The opposite end of the coil is connected to the common conductor 36. The controller terminals 30, 32 and 42 to which the electrical conductors are connected also are shown in FIG. 2.

The battery charger controller illustrated in FIG. 1 ordinarily can be installed within a conventional timer-controlled battery charger by removing the timer component and replacing it with the controller module. The controller module functions to control the operation of an associated relay coil 50 the contacts 52 of which are arranged in series with the coil 46 of the alternating current power contactor relay.

Figure 2:
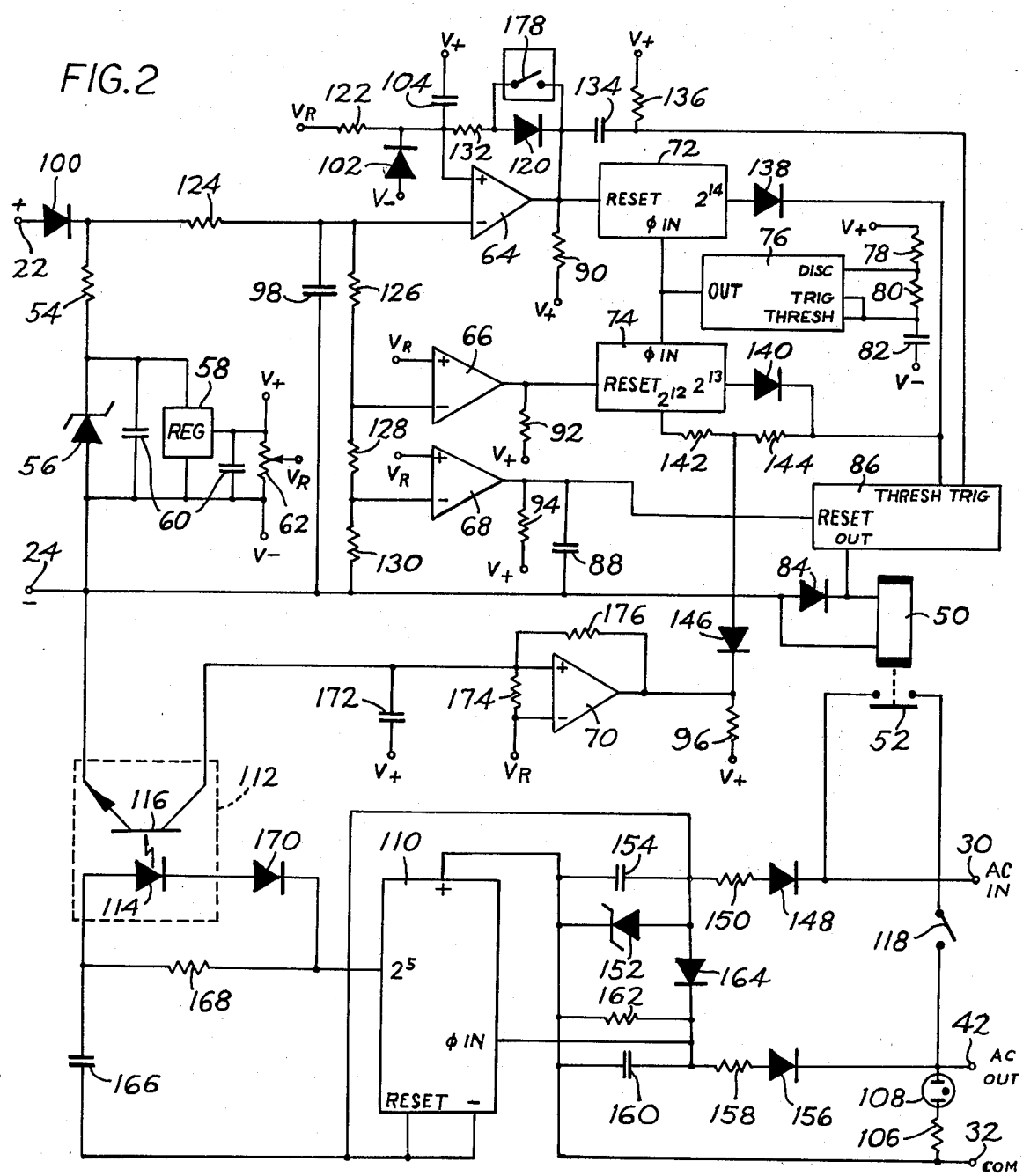
FIG. 2 is a schematic electrical diagram of an electric circuit arrangement for the battery charger controller arrangement of FIG. 1.

Referring to FIG. 2 of the drawing, the electronic circuit illustrated therein includes a voltage regulated supply formed of a resistor 54, a zener diode 56, a regulator 58, such as a model 7812 H, capacitors 60 and a potentiometer 62. This supply provides the necessary power at the positive and negative terminals V+ and V− for the integrated circuits that are employed. It also provides a voltage reference at terminal $V_R$.

The circuit also contains four comparators 64, 66, 68 and 70, such as integrated circuit LM 339, the first three of which are utilized to compare the incoming direct current voltage signal with the voltage reference $V_R$. Comparator 70 is utilized in the automatic equalize function described hereinafter. Two counters 72 and 74, such as integrated circuit CD 4020, function to provide time delays, the amount of time delay being determined by the number of stages employed in the counters and the clock frequency provided by timer 76, such as integrated circuit LM 555. The frequency of electrical pulses produced by the timer is determined by resistances 78 and 80 and capacitor 82. Diode 84 protects against inductive spikes caused when relay coil 50 deenergized.

Timer 86, such as integrated circuit LM 555, is employed as a relay driver and functions as a switch of a latching relay which is turned on through a trigger input, turned off through a threshold input and turned off and held off through a reset input. Capacitor 88 holds the reset to the timer low momentarily upon start-up so that the timer starts up in the "off" condition. The resistors 90, 92, 94 and 96 are collector resistors for the comparators. The capacitor 98 functions to filter noise and alternating current ripple of the input signal.

The diode 100 provides reverse polarity protection, while the diode 102 functions to bypass the charge on capacitor 104 to the negative supply when the battery 10 is disconnected. The resistor 106 functions as a voltage dropping resistor for the neon lamp 108 which provides indication that the unit is on.

An automatic equalize function is provided by a circuit which includes the counter 110, comparator 70 and optic coupler 112 formed by the light emitting diode 114 and the phototransistor 116. This optic coupler isolates the direct current circuit from the potentially damaging high alternating current power supply.

The battery charger controller of this invention provides a variety of functions. It provides for wrong voltage battery rejection. That is, if a battery of one voltage is connected to a battery charger of a different voltage, the controller will prevent turn-on of the battery charger. The controller also provides over-voltage shutdown. That is, when the output voltage of the battery charger exceeds a maximum voltage level, the controller will effect turn-off of the battery charger. The controller also provides elapsed time, or straight time turn-off of the battery charger. That is, if a battery and battery charger combination does not ever reach a predetermined voltage, the controller will shut the battery charger off in a given length of time.

The controller also provides charge-dependent timing of the battery charger by varying the charging time to match a battery re-charge needs. At a preset number of charging cycles, the charge-dependent time portion automatically extends its time interval to provide an equalize charge function. This allows for periodic overcharging a battery to insure full charge of all cells. The time interval then is automatically returned to normal on the next cycle.

The controller also functions to activate a battery charger automatically upon connection of a battery to the charger, thereby avoiding the requirement of manual settings or switch operations to effect the start function.

The controller also provides for turn-on of a battery charger at a specific time for minimizing peak power demands.

The general operation of the controller of this invention is as follows:

A battery 10 is connected to the battery charger 16 which applies a direct current voltage to the battery charger controller 20. The controller then activates the relay coil 50 to close the contacts 52 and complete the electric circuit from the alternating current input terminal 30 to the alternating current output terminal 42. For this purpose, it is to be understood that the manual safety switch 118 is in the closed position for automatic operation of the controller. Current thus flows through the coil 46 of the alternating current input contactor relay, closing its contacts 48 and thereby energizing the battery charger. As the battery is charged, its voltage gradually rises. When the battery voltage has reached and stayed above a predetermined level for a specific period of time, the controller turns off the battery charger. If the battery voltage never reaches the preset level, then a straight elapsed time function will shut the charger off. If the battery charger has a fault, resulting in too high a voltage output, the controller will shut the battery charger off immediately.

The electronic circuit and its functions now will be described.

Upon coupling of connectors 12 and 14, the voltage at the positive terminal of comparator 64 will be pulled up initially to the positive voltage supply V+ because of capacitor 104. The output of comparator 64 will also be high and the diode 120 will be reversed biased. As time progresses, the capacitor 104 will be charged through resistor 122. The voltage at the positive terminal of comparator 64 will gradually diminish and approach the reference voltage $V_R$.

Let it be assumed that a battery is below an acceptable voltage range. Accordingly, the voltage developed between resistors 124 and 126 will be less than the reference voltage $V_R$ and the comparator 64 will not transfer state. Accordingly, timer switch 86 will not trigger and relay coil 50 will not energize.

If the battery voltage is above the acceptable range, then the voltage at the junction of resistors 128 and 130 will be greater than the reference voltage and the comparator 68 will hold a reset signal on the timer switch 86 which will keep the latter off and prevent energization of the relay coil 50.

If the battery voltage is within the acceptable voltage range, then the following events will occur:

The voltage at the junction of resistors 124 and 126 will be above the reference voltage, and when the voltage at the positive input terminal of comparator 64 reaches the voltage at the minus input terminal V−, the comparator will turn on, causing its output to go low. As a result, diode 120 becomes forward biased and the combination of resistor 132 and diode 120 pulls the junction of capacitor 104 and the positive input of comparator 64 still lower, thereby latching the comparator in the low state. The voltage across capacitor 134 was zero and therefore the junction of resistor 136 and capacitor 134, which was at the positive supply voltage, momentarily dips to zero. Then, as the capacitor 134 is charged through the resistor 136, the voltage at the junction thereof rises and approaches the positive supply voltage again. This trigger function is enough to turn the timer switch 86 on and energize the relay coil 50.

The straight elapsed time function operates as follows:

At the same time that the comparator 64 output goes low, the reset on counter 72, holding its count at zero, is removed, allowing the counter to start counting. When the counter reaches the desired number of counts, for example 2 to the 14th power as illustrated, an output signal passes through the diode 138 to the threshold of the timer switch 86, turning off the relay coil 50.

The charge-dependent time function operates as follows:

If, during the charging cycle, the voltage reaches a specific level, for example 2.37 volts per cell in lead acid batteries, the junction between the resistors 126 and 128 reaches the reference voltage $V_R$. At that point comparator 66 is turned on, resulting in the reset on counter 74 being removed. The output pulses from timer 76 now start counting on counter 74. When the counter reaches the desired number of counts, it will turn the timer switch 86 off and deenergize relay coil 50, through either diode 140 or resistors 142 and 144.

A typical range of the time cycle for counter 72 is 10 to 20 hours; counter 74 at the 2 to the 12th power terminal is 2-4 hours and at the 2 to the 13th power output terminal it is 4-8 hours.

The automatic equalize function operates as follows: First, the incoming alternating current power at the alternating current input terminal 30 is coupled to counter 110 through diode 148, resistor 150, zener diode 152 and capacitor 154, and this provides a power supply for the counter 110 as long as electrical power is supplied to the battery charger 16 between the alternating current input terminal 30 and the common terminal 32. Counter 110 counts the number of times that relay contacts 52 and safety switch 118 close. Each time the relay coil 50 energizes and the safety switch 118 is closed, then power appears at the alternating current output terminal 42 which is coupled to the counter through diode 156, resistor 158, capacitor 160, and resistor 162. The voltage across capacitor 160 and resistor 162 is limited to the voltage present at the zener diode 152 by diode 164. The resulting waveform approximates a square wave where it is at the positive supply voltage for the counter when either the relay contacts 52 or safety switch 118 is open, and at approximately the regulated negative supply voltage for the counter when the relay contacts and safety switch are closed. One cycle is completed when the relay coil 50 energizes, deenergizes and reenergizes again.

During the period when the output of counter 110 is high, capacitor 166 is being charged to approximately the positive voltage supply through resistor 168, since diode 170 is reverse biased. When the counter counts up to a specific number, for example 2 to the 5th power in the illustration, the output drops to a low value and the capacitor 166 discharges through the light emitting diode 114 and the diode 170, which now is forward biased. The light emitting diode produces a short pulse of light that is coupled to the phototransistor 116, momentarily turning the latter on.

Upon initial start-up of the unit, when a battery is connected to the direct current terminals of the charger, capacitor 172 causes comparator 70 to start up with the output high. When the controller turns the battery charger on, the counter 110 is advanced one count. It is at this time only that the phototransistor 116 is pulsed, whereupon it lowers the voltage across the positive input of the comparator 70, causing the output of the comparator to go low. The resistors 174 and 176 thereupon latch the comparator 70 in the low state until the next charge cycle. This comparator 70 functions as a latching relay switch.

When comparator 70 latches on, the junction of resistors 142 and 144 is pulled to ground level through diode 146. Accordingly, the output occurring from the 2 to the 12th power output terminal of counter 74 does not pass through the resistors to the threshold terminal of the timer switch 86. However, an output occurring either from the 2 to the 13th power terminal of counter 74 or from the 2 to the 14th power terminal of counter 72 is coupled to the threshold terminal of the timer switch 86. The relay coil 50 and hence the charger 16 are kept activated for a longer than normal time.

The delay start-up function operates as follows: In the start-up of the controller, a short time delay is provided by the capacitor 104 being charged through the resistor 122. If the delay start switch 178 is closed across the diode 120, then the resistor 132 will cause the voltage across the capacitor 104 to be small, resulting in the controller not turning on until the delay start switch is opened. During the time that the delay start switch is closed, counter 72 is held at zero so that no counting or timing function occurs until the controller energizes the relay coil 50.

When the delay start switch is opened, diode 120 is reverse biased, so the reference voltage $V_R$ will appear at the positive input of comparator 64. The latter thereupon transfers state, resulting in activation of timer switch 86 and turning on of the charger 16.

Once the controller 18 and charger have turned on, further opening and closing of the delay start switch will have no effect. The unit will not recycle until the battery has been disconnected and reconnected.

Delay start switch 178 typically is a timer-controlled switch, enabling the charger to be energized automatically at a later time.

Figure 3:
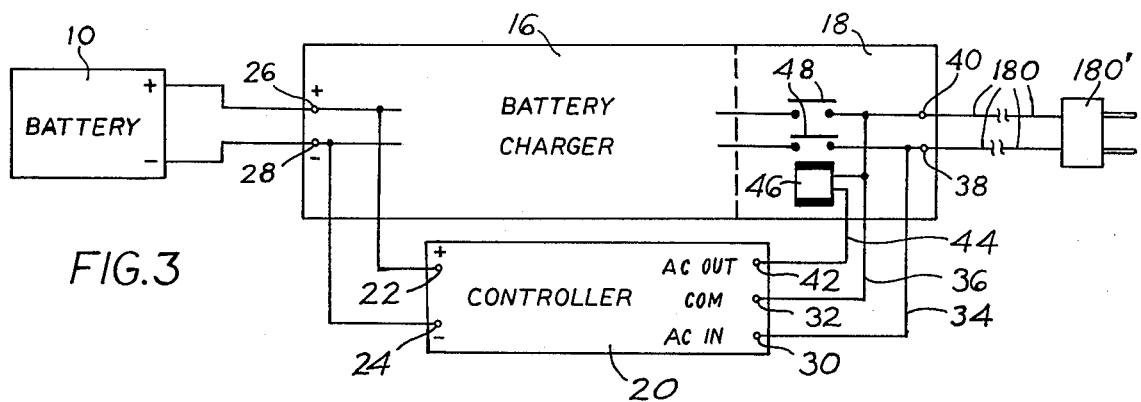
FIG. 3 is a block diagram showing the electrical association of a battery connected, as in an electric vehicle, permanently to a battery charger removably connectable to a source of alternating current potential, and a charger controller embodying the features of this invention.
Figure 4:
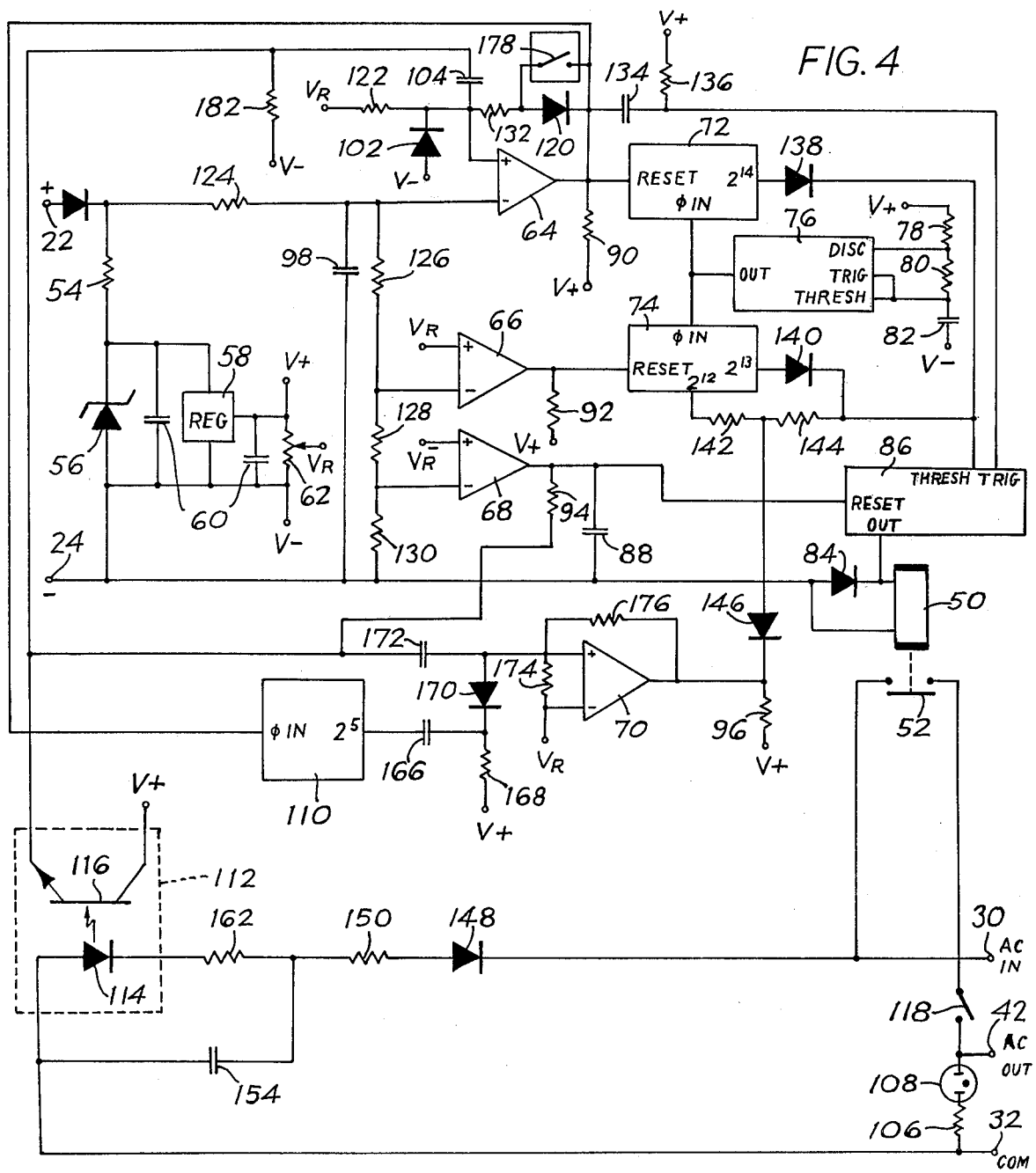
FIG. 4 is a schematic electrical diagram of an electric circuit arrangement for the battery charger controller arrangement of FIG. 3.

The embodiment illustrated in FIGS. 3 and 4 of the drawings is designed for such used as the charging of a battery pack of an electrically powered automobile, wherein the battery charger 16 is connected permanently to the battery pack 10 and is adapted for removable connection periodically to a source of alternating current potential by means of an extension cord 180 with plug 180'.

Resetting of the system of FIGS. 1 and 2 for a new charging cycle is achieved by disconnecting and reconnecting the connectors 12 and 14, to reset comparators 64 and 70 to their "off" state. Resetting of the system of FIGS. 3 and 4 is achieved by disconnecting the extension cord plug 180' from a source of alternating current potential and then re-connecting it, to reset the comparators 64 and 70 to their "off" states. Thus, alternating current supplied to terminals 30 and 32 in FIG. 4 energizes the light emitting diode 114 and phototransistor 116 of the optic coupler 112. The junction between phototransistor 116 and emitter resistor 182 rises to the positive direct current supply V+, as does the junction between capacitors 104 and 172, thereby initiating the condition which results in the resetting of comparators 64 and 70 to their "off" state, as described hereinbefore.

The collector resistor 94 in FIG. 2 is connected in FIG. 4 to the emitter of phototransistor 116 and functions to insure the resetting of timer 86 and thus the deactivation of relay coil 50, upon disconnecting of the plug 180' from the source of alternating current potential.

In the automatic equalize function of the embodiment illustrated in FIG. 4, the output of comparator 64 is applied to the input of counter 110, whereby the latter counts each time comparator 64 triggers the charging system on.

The function of capacitor 166, optic coupler 112 and diode 170 in FIG. 2 to actuate comparator 70, is achieved in FIG. 4 by capacitor 166 and diode 170. During the time when the counter 110 output is high, capacitor 166 is being discharged. When counter 110 counts an appropriate number of cycles, its output goes from the positive direct current supply V+ to zero. Capacitor 166 momentarily pulls the junction of resistor 168 and diode 170 to zero, resulting in the junction of resistors 174 and 176, capacitor 172 and diode 170 going to zero, thereby causing comparator 70 to latch "on" for this one charge cycle, whereby to keep the charger actuated for a longer than normal time for that cycle. With counter 110 output at zero, capacitor 166 charges to V+ through resistor 168, allowing the charger to return to normal charge time on subsequent charge cycles.

The other functions described in connection with the embodiment of FIGS. 1 and 2 are performed in similar manner in the embodiment of FIGS. 3 and 4.

It will be apparent to those skilled in the art that various changes may be made in the type, number and arrangement of parts described hereinbefore. For, example, timer 76 may be provided as two separate timers. one for each of the counters 72 and 74. The single timer illustrated is preferred for its simplicity and minimum cost. The output of comparator 70 may be connected to the frequency determining network 78, 80, 82 of the timer-counter assembly rather than to the junction between resistors 142 and 144 as illustrated. In such event the counter 74 need have only one count output, since the variable frequency of the timer will vary the time required for the counters to reach their count. The combination of timer 86 and relay coil 50 provides the actuator for switch assembly 52 and contactor component 18 and is preferred for its versatility in interfacing with a wide variety of existing battery charges. If desired, the actuator combination and switch assembly may be replaced by solid state relays, with appropriate logic modifications. These and other changes may be made without departing from the spirit of this invention and the scope of the appended claims.

Having now described my invention and the manner in which it may be used, I claim:

1. A controller for a battery charger having an alternating current input and a direct current output for connection to a battery to be charged, the controller comprising:
   (a) electric switch means arranged for connection in the alternating current circuit of the charger for controlling activation and deactivation of the charger,
   (b) electric actuator means for said switch means having a direct current electric circuit,
   (c) voltage level comparison means having an output operatively connected to the actuator means and an input connected to the direct current output of the charger and operable when the battery voltage is below a predetermined level to cause the actuator means to keep the electric switch means open and the charger deactivated and operable when the battery voltage is above said predetermined voltage level to cause the actuator means to close the electric switch means and activate the charger, and
   (d) delay start switch means connected across the voltage level comparison means, and having open and closed positions and operable in one of said positions to prevent activation of the charger and in the other of said positions to allow activation of the charger.

2. The controller of claim 1 wherein the delay start switch means is a timer controlled electric switch.

3. A controller for a battery charger having an alternating current input and a direct current output for connection to a battery to be charged, the controller comprising:
   (a) first electric switch means arranged for connection in the alternating current circuit of the charger for controlling activation and deactivation of the charger,
   (b) first electric actuator means for said first switch means having a direct current electric circuit,
   (c) voltage level comparison means having an input connected to the direct current output of the charger,
   (d) electrically actuated timer pulse generating means,
   (e) first electrically actuated counter means connected to the timer pulse generating means for providing a time delayed output from the first counter means, said first counter means being arranged between the voltage level comparison means and the first actuator means and operable by said comparison means when the battery voltage rises to a predetermined level during the battery charging phase and after said time delay to operate the first switch actuator means to open the first electric switch means and deactivate the charger,
   (f) second electrically actuated counter means for counting the number of activations of the charger,
   (g) second electric switch means in the direct current electric circuit of the assembly of timer means and first counter means, and
   (h) second electric actuator means for the second switch means connected to the output of the second counter means and operable by the latter after a predetermined number of activations of the charger to extend said time delay.

4. The controller of claim 3 wherein the first counter means has two outputs of different counts connected to the first actuator means, and the second switch means is connected to the outputs of the first counter means in such manner that when the second actuator means is operated by the second counter means it operatively connects the higher count output to the first actuator means.

5. The controller of claim 3 wherein the second electric switch means and its actuator means comprises a comparator arranged to function as a latching relay and having its input connected to the output of the second counter means and its output connected to the assembly of timer means and first counter means.

6. The controller of claim 5 wherein the first counter means has two outputs of different counts connected to the first actuator means, and the comparator output is connected to the outputs of the first counter means in such manner that when the comparator is operated by the second counter means it operatively connects the higher count output to the first actuator means.

7. The controller of claim 3 including:

(a) second voltage level comparison means having an output operatively connected to the first actuator means and an input connected to the direct current output of the charger and operable when the battery voltage is below a predetermined level to cause the first actuator means to keep the first electric switch means open and the charger deactivated and operable when the battery voltage is above said predetermined voltage level to cause the first actuator means to close the first electric switch means and activate the charger, and (b) third electrically actuated counter means connected to the timer pulse generating means for providing a time delayed output from the third counter means, said third counter means being arranged in the direct current electric circuit between the second comparison means and the first switch actuator means and operable by said second comparison means when the battery voltage is above said predetermined voltage level and after said time delay to operate the first switch actuator means to open the first electric switch means and deactivate the charger.

8. The controller of claim 7 including third voltage level comparison means having an output operatively connected to the first actuator means and an input connected to the direct current output of the charger and operable when the battery voltage exceeds a predetermined maximum level to cause the first actuator means to open the first electric switch means and deactivate the charger.

9. The controller of claim 7 wherein the second counter means has an input connected to the first electric switch means for counting the number of actuations of the latter and an output connected to the input of the second actuator means.

10. The controller of claim 7 wherein the second counter means has an input connected to the output of the second comparison means for counting the number of activations of the charger, and an output connected to the input of the second actuator means.

11. The controller of claim 7 wherein:
(a) the second electric switch means and its actuator means comprises a comparator arranged to function as a latching relay and having its input connected to the output of the second counter means and its output connected to the assembly of timer means and first and third counter means, and
(b) the first counter means has two outputs of different counts connected to the first actuator means, the third counter means has a count output greater than the higher count output of the first counter means, and the comparator output is connected to the outputs of the first counter means in such manner that when the comparator is operated by the second counter means it operatively connects the higher count output of the first counter means or the count output of the third counter means to the first actuator means.

12. The controller of claim 3 including:
(a) second voltage level comparison means having an output operatively connected to the first actuator means and an input connected to the direct current output of the charger and operable when the battery voltage is below a predetermined level to cause the first actuator means to keep the first electric switch means open and the charger deactivated and operable when the battery voltage is above said predetermined voltage level to cause the first actuator means to close the first electric switch means and activate the charger, (b) third electrically actuated counter means connected to the timer pulse generating means for providing a time delayed output from the third counter means, said third counter means being arranged in the direct current electric circuit between the second comparison means and the first switch actuator means and operable by said second comparison means when the battery voltage is above said predetermined voltage level and after said time delay to operate the first actuator means to open the first electric switch means and deactivate the charger, (c) the second electric switch means and its actuator means comprising a comparator arranged to function as a latching relay and having its input connected to the output of the second counter means and its output connected to the assembly of timer means and first and third counter means, (d) the first counter means having two outputs of different counts connected to the first actuator means, the third counter means having a count output greater than the higher count output of the first counter means, and the comparator output being connected to the outputs of the first counter means in such manner that when the comparator is operated by the second counter means it operatively connects the higher count output of the first counter means or the count output of the third counter means to the first actuator means, and (e) timer controlled delay start switch means connected across the second voltage level comparison means and having open and closed positions and operable in one of said positions to prevent activation of the charger and in the other of said positions to allow activation of the charger.

* * * * *